Sept. 25, 1951  L. F. RONAN  2,568,870
SAW
Filed Oct. 31, 1945
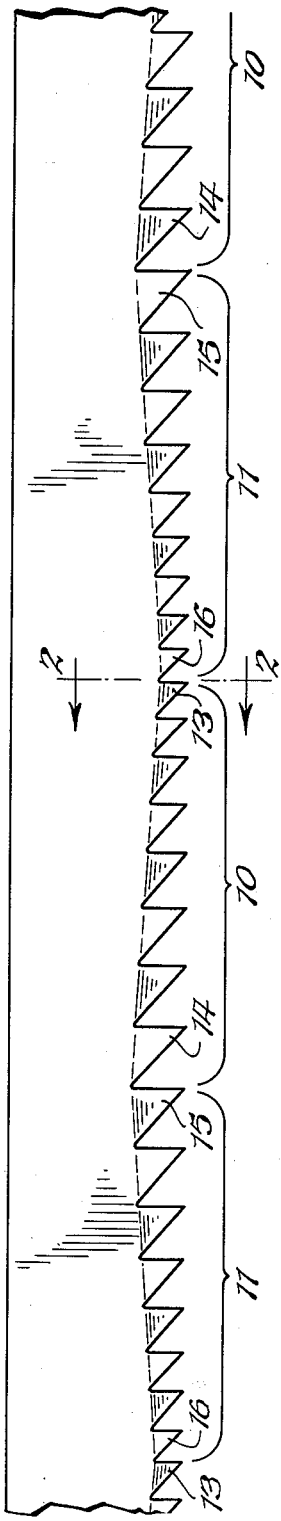
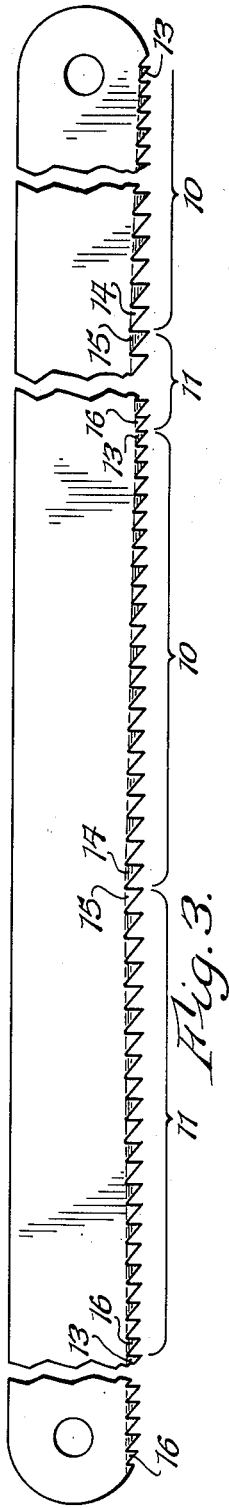
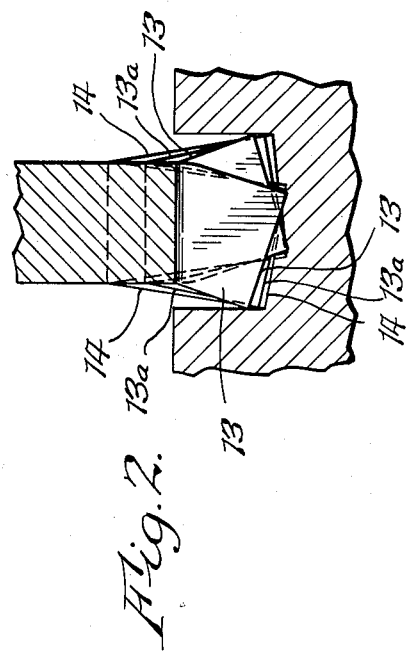
INVENTOR
Lerned F. Ronan,
BY
ATTORNEYS Patented Sept. 25, 1951

2,568,870

UNITED STATES PATENT OFFICE 2,568,870

SAW

Lerned F. Ronan, East Aurora, N. Y.

Application October 31, 1945, Serial No. 625,774

1 Claim. (Cl. 29—95)

This invention relates to improvements in saws, more particularly for cutting metal, and has for an object to provide a novel toothed arrangement or formation suitable for both continuous motion or band saws, and reciprocating or hack saws, whereby the efficiency and cutting speed of such saws are increased, their cutting performance improved, and the life of the saws is prolonged by reducing the danger of breakage of the saws or their teeth.

U. S. Patent No. 2,227,864, granted to me January 7, 1941, discloses a saw having teeth which are of progressively increased size lengthwise of the toothed edge of the saw. That is, the teeth increase gradually in depth or length and also in pitch, or distance between the points of adjacent teeth, the finest tooth being at one end of the series of teeth and the coarsest tooth at the other end of the series. The increase in size is gradual from end to end of the whole series or line of teeth, with only a small difference in size between any adjacent teeth. In said saw, while the teeth thus vary in size, the different sized teeth are set to a constant, uniform width of set at their cutting edges, the angle of set of the teeth varying with the variations in length of the teeth, so that the longer teeth will not be offset from the plane of the blade to any greater distance than the shorter teeth, and all of the teeth will cut a kerf of the same width. Said patented saws have various advantages, recited in said patent, over previously known saws, resulting in improved cutting speed and performance of the saws.

In certain aspects this invention is in the nature of an improvement on said patented saws; other objects of the invention being to provide saws having a novel tooth arrangement or formation, analogous in some respects to, and affording the advantages of, that of said patented saws, but differing therefrom in important particulars, whereby saws of greater efficiency, cutting performance and durability are obtained; also to provide a novel tooth arrangement or formation which is especially desirable for saws of the band or continuous motion type; also to provide a saw having teeth which vary gradually in size or depth and pitch, but in which the teeth are disposed in successive groups, or series of teeth, with the teeth of one group gradually increasing in size from the leading end of the group and the teeth of the adjoining group gradually decreasing in size from the leading end of the group, so that the teeth alternately gradually increase and gradually decrease in size throughout the length of the toothed edge of the saw and thereby prevent any abrupt change or jump in size from a large tooth to a small tooth at any point in the length of the toothed edge.

While such tooth arrangement or formation is especially desirable in band saws, or saws which operate by a continuous movement in one direction, nevertheless it is also applicable to and materially improves the efficiency, cutting performance and durability of hand and power-driven saws which operate by a reciprocating motion.

Further objects and advantages of the invention will appear from the following specification of the preferred embodiments of the invention shown in the accompanying drawings, and the novel features of the invention are set forth in the appended claim.

In said drawings:

Fig. 1 is a side elevation of a portion of a band or continuous motion saw provided with a tooth arrangement or formation embodying my invention.

Fig. 2 is a transverse, sectional elevation on line 2—2, Fig. 1, greatly enlarged, to illustrate the uniform width of set with varying angularity of set of teeth of different sizes.

Fig. 3 is a side elevation of a reciprocating motion or hack saw embodying the invention, portions of the saw being broken away to reduce the length of the figure.

In saws embodying my invention, as illustrated in the drawings, the teeth are arranged in successive groups or series along the toothed edge of the saw, several of such groups or series being respectively designated by the brackets numbered 10, 11, in Figs. 1 and 2. The teeth composing each of these groups or series vary gradually in size from one end to the other end of the group, the teeth in each group or series 10, for example, gradually increasing in size, both as to depth and pitch, from the finest tooth 13 at the leading end of the group to the coarsest tooth 14 at the opposite or final end of the group, while in each next succeeding group or series 11, the teeth gradually decrease in size, from the coarsest tooth 15 at the leading end of the group to the finest tooth 16 at the final end of the group. That is, the teeth gradually increase and decrease in size in alternating groups or series throughout the length of the toothed edge or effective cutting length of the saw. The final tooth of each group, considered with regard to the direction of travel of the saw when cutting, being followed by a first tooth of the next group, differing only minutely in size therefrom, finer or coarser, depending upon whether the final tooth of the former group is a coarse tooth or a fine tooth. There is therefore no pronounced difference in size between the final tooth of any one group and the leading tooth of the next following group. While the teeth vary in depth or length, yet the outer ends or points of all of the teeth are disposed in an approximately straight line.

Notwithstanding that the teeth of successive groups or series thus gradually increase, then decrease, and then increase in size in the alternate groups or series, nevertheless the cutting ends or edges of the teeth of the different sizes all have the same ultimate width of set. For example, as represented in Fig. 2, the finest or shortest tooth at one end of any group or series is set at a greater angle to the plane of the saw blade than the coarsest or longest tooth at the opposite end of the group or series. In Fig. 2, 13 represents the finest tooth of a group or series, 14 the coarsest tooth of the series, and 13a one of the teeth at an intermediate point in the series. As shown in this figure, the angles of set of these teeth differ, but the amount of offset of the cutting ends or edges of the different teeth is the same. In order to avoid confusion of representation, only the two teeth at the opposite ends of the series and one intermediate tooth in the series are illustrated in Fig. 2, but it will be understood that the angles of offset gradually change from the finest tooth at one end of each series to the coarsest tooth at the opposite end of said series.

Thus, the cutting end or edge of each tooth of any group or series will cut in a different path from all of the other teeth of the group, the differences in paths of cut between any two adjacent teeth being minute, and this difference in action of the several teeth of the groups being gradual. In the operation of the saw, there is no abrupt or great change of position or cutting action between the tooth at either end of any group or series and the next adjacent tooth of the adjoining series or group, as there would be if in one group the teeth increased in size from the finest tooth at the leading end of the group to the coarsest tooth at the final end of the group, and then, in the next succeeding group, the teeth also increased in size in the same direction from the finest tooth to the coarsest tooth. In such a case the coarsest tooth of one group or series would be immediately followed by the finest tooth of the next group or series, which would cause an abrupt or decided jump or momentary change in the cutting action of the saw. The described formation of the teeth produces a generating cutting action which is more like a milling action and reduces the hacking action of the usual hack saw.

My invention is not limited to any particular size of the teeth or the number of the alternating groups of teeth in a saw, or the particular lengths of, or numbers of teeth in the several groups, or any particular variation in the sizes of the teeth in a group; these various factors depending upon the use to which a saw embodying the invention is to be put, or the nature or sizes of the pieces of work to be cut. For example, saws having relatively fine teeth of varying sizes are more suitable for small pieces of work and saws with relatively coarser teeth of varying sizes for larger pieces of work. One saw may have, for example, coarse teeth increasing in size in one group of teeth from a four point tooth to a three point tooth to a two point tooth and then decreasing in size in the succeeding group from a two point tooth to a three point tooth to a four point tooth and so on; while another saw may have, for example, teeth varying in size in alternate groups, increasing from a thirty-two point tooth through thirty-one, thirty, and twenty-nine point teeth to a twenty-eight point tooth and decreasing gradually from the twenty-eight point tooth to a thirty-two point tooth. And other saws may have alternating groups of teeth graduated from ony one to another appropriate point sizes between the above exemplified extremes, depending upon the sort of work for which the saws are intended.

In the case of band saws, which run continuously in one direction, considerable latitude is permissible in the lengths of the alternating groups of the teeth of increasing and decreasing size. Whatever the lengths of the groups and the ultimate difference in size between the finest and coarsest teeth of each group, there is no great or pronounced difference in size between the final tooth of one group and the first or leading tooth of the next succeeding group, and the saw will run smoothly without jumping or chattering and cut with great efficiency and speed.

In the case of power-driven reciprocating or hack saws, in which the length of the cutting stroke of the saw is usually about one-half the length of the saw blade, it is desirable that the lengths of the alternating groups of teeth of increasing and decreasing sizes, should be such that at least two or more of the full alternating groups of teeth will travel across the piece of work being cut, or pass through the saw kerf at each cutting stroke of the saw. By such relative length of the alternating groups or series of graduated or varying sized teeth, it is ensured that all of the various sized teeth will participate in cutting a given piece of work in every working stroke of the saw, thereby obtaining the maximum efficiency and cutting speed of the saw which, in many instances, depends upon cutting action of the largest teeth provided in the saw. Such would not be the case if the length of the alternating groups or series of teeth were longer than the stroke of the saw, since then the teeth in the final portion of the group would not participate in the cutting and a portion of the saw would be inactive or remain unused unless the relative position between the work and saw were changed or adjusted from time to time, which would consume time and add to the labor of operating the saw.

Saws embodying my herein disclosed invention will cut faster and with greater efficiency and smoother action and will last longer than previous saws of standard or accepted forms appropriate for a given class of work.

In making the described saws, as in the case of the accustomed metal cutting saws, the teeth are cut or machined and set before hardening or tempering treatment, and then preferably the saw is suitably treated to make the teeth file-hard or of a degree of hardness usual at present in metal cutting power saws.

I claim as my invention:

A saw blade having a toothed edge provided by a series of groups of teeth each of which is of relatively short longitudinal extent with respect to that of the blade, said groups of teeth being arranged in pairs wherein the teeth of one group in each pair increase progressively in length and pitch from a short terminal tooth to a long terminal tooth and wherein the teeth of the other group of each pair decrease progressively in length and pitch from a long terminal tooth to a short terminal tooth, the terminal short teeth of each pair of groups adjoining the terminal short teeth of each adjacent pair of groups, the teeth of said groups being set angularly and alternately sidewise and the shorter teeth being set at a greater angle than the longer teeth so that all teeth of said groups extend laterally to the same extent, the points of the teeth of the several groups terminating approximately in a common plane normal to the plane of the blade.

LERNED F. RONAN.

REFERENCES CITED

The following references are of record in the file of this patent:

UNITED STATES PATENTS

| Number | Name | Date |
|---|---|---|
| 72,983 | Davis | Jan. 7, 1868 |
| 147,609 | Clemson | Feb. 17, 1874 |
| 336,739 | Parker | Feb. 23, 1886 |
| 817,361 | Brown et al. | Apr. 10, 1906 |
| 1,850,478 | Schaeffer | Mar. 22, 1932 |
| 2,227,864 | Ronan | Jan. 7, 1941 |

FOREIGN PATENTS

| Number | Country | Date |
|---|---|---|
| 741,168 | France | Feb. 8, 1933 |